United States Patent
Cooper et al.

(10) Patent No.: US 9,010,027 B2
(45) Date of Patent: Apr. 21, 2015

(54) PANEL ATTACHMENT SYSTEM AND A METHOD OF USING THE SAME

(71) Applicant: ROLLS-ROYCE plc, London (GB)

(72) Inventors: Joseph Barnsdale Cooper, Bristol (GB); Paul Robert Hayton, Olveston (GB); Joseph Rowlands-Conway, Cirencester (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/225,968

(22) Filed: Mar. 26, 2014

(65) Prior Publication Data

US 2014/0366453 A1 Dec. 18, 2014

(30) Foreign Application Priority Data

Jun. 12, 2013 (GB) .................................. 1310440.1

(51) Int. Cl.
*E05C 21/02* (2006.01)
*F24F 13/20* (2006.01)
*F01D 25/24* (2006.01)
*F01D 25/30* (2006.01)
*F02K 1/80* (2006.01)
*F02K 1/82* (2006.01)
*F16B 5/02* (2006.01)
(Continued)

(52) U.S. Cl.
CPC ................ *F24F 13/20* (2013.01); *F01D 25/24* (2013.01); *F01D 25/30* (2013.01); *F02K 1/80* (2013.01); *F02K 1/82* (2013.01); *F16B 5/0241* (2013.01); *F02C 7/20* (2013.01); *E05C 19/005* (2013.01); *F05D 2250/12* (2013.01); *F05D 2260/941* (2013.01); *F05D 2250/42* (2013.01); *F05D 2260/31* (2013.01)

(58) Field of Classification Search
CPC .......... F24F 13/20; E05C 19/005; F02K 1/80; F02C 7/20
USPC .................... 49/463, 465, 467, 506
See application file for complete search history.

(56) References Cited

U.S. PATENT DOCUMENTS

| | | | |
|---|---|---|---|
| 2,547,619 A | 4/1951 | Buckland | |
| 2,849,764 A * | 9/1958 | Rich et al. .......................... | 49/70 |

(Continued)

FOREIGN PATENT DOCUMENTS

| | | |
|---|---|---|
| GB | 1118257 | 6/1968 |
| GB | 2470051 A | 11/2010 |

OTHER PUBLICATIONS

Dec. 11, 2013 British Search Report issued in British Application No. 1310440.1.

(Continued)

*Primary Examiner* — Jerry Redman
(74) *Attorney, Agent, or Firm* — Oliff PLC

(57) ABSTRACT

A panel attachment system comprises a panel and a casing. The panel has a fixed mount bracket, and a sliding mount bracket. The casing has a first fixed mount boss, and a sliding mount boss. When the panel attachment system is in use, the fixed mount bracket is fixedly secured to the first fixed mount boss, and the sliding mount bracket is slidingly engaged with the sliding mount boss. This enables the panel to be detachably connected to the casing, such that any relative in-plane thermal expansion between the panel and the casing is accommodated by corresponding relative movement between the sliding mount bracket and the sliding mount bosses.

8 Claims, 4 Drawing Sheets

(51) Int. Cl.
*F02C 7/20* (2006.01)
*E05C 19/00* (2006.01)

(56) References Cited

U.S. PATENT DOCUMENTS

| | | | |
|---|---|---|---|
| 4,106,236 A * | 8/1978 | Oliphant | 49/141 |
| 4,391,065 A * | 7/1983 | Rice | 49/465 |
| 4,813,809 A | 3/1989 | Stratman et al. | |
| 4,864,818 A | 9/1989 | Taylor | |
| 5,059,055 A | 10/1991 | DeGress et al. | |
| 5,069,034 A | 12/1991 | Jourdain et al. | |
| 6,505,441 B1 * | 1/2003 | Shuey et al. | 49/463 |
| 7,707,789 B2 * | 5/2010 | Janesky | 52/169.6 |
| 8,276,319 B2 * | 10/2012 | Duffy | 49/466 |
| 8,745,926 B2 * | 6/2014 | De Domenico | 49/465 |
| 8,813,426 B2 * | 8/2014 | Chwala | 49/465 |
| 2002/0184827 A1 * | 12/2002 | Duffy | 49/463 |
| 2006/0143987 A1 * | 7/2006 | Duffy | 49/463 |
| 2007/0204530 A1 * | 9/2007 | Janesky | 52/169.14 |
| 2010/0180509 A1 * | 7/2010 | Pridemore et al. | 49/465 |
| 2013/0074415 A1 * | 3/2013 | Rix | 49/465 |

OTHER PUBLICATIONS

Sep. 8, 2014 Search Report issued in European Application No. 14161680.

\* cited by examiner

PANEL ATTACHMENT SYSTEM AND A METHOD OF USING THE SAME

This invention claims the benefit of UK Patent Application No. 1310440.1, filed on 12 Jun. 2013, which is hereby incorporated herein in its entirety.

FIELD OF THE INVENTION

The present invention relates to a panel attachment system and particularly, but not exclusively, to a panel attachment system for an exhaust gas duct.

BACKGROUND TO THE INVENTION

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth of the exhaust duct resulting from thermal expansion of the duct. Such mounting arrangements are required to accommodate movement of the duct both axially and laterally and can be mechanically complicated.

It is an object of the present invention to provide a mounting arrangement for a non-circular cross-section exhaust duct that supports the exhaust duct.

Previous jet pipe liner hanger systems have used expensive machined parts to control exhaust duct liner location and require a high number of part variations, making the assembly complicated. Furthermore, large numbers of hangers can obstruct the airflow passing between surfaces, impacting the effectiveness of the air supply.

STATEMENTS OF INVENTION

According to a first aspect of the present invention there is provided a panel attachment system comprising:
 a panel comprising:
  a fixed mount bracket; and
  a sliding mount bracket; and
 a casing comprising:
  a first fixed mount boss; and
  a sliding mount boss;
   the sliding mount boss comprising:
    a second fixed mount boss; and
    a locating tongue comprising a first end and a second end, the second end extending substantially parallel to the casing,
 wherein, in use, the fixed mount bracket is fixedly secured to the first fixed mount boss, and the first end of the locating tongue is connected to the second fixed mount boss by a threaded fastener, and the second end of the locating tongue is slidingly engaged with the sliding mount bracket, to thereby detachably connect the panel to the casing, such that any relative in-plane thermal expansion between the panel and the casing is accommodated by corresponding relative movement between the sliding mount bracket and the sliding mount boss.

An advantage of the invention is that the panel attachment system is scalable and so may be applied to the mounting of panels of varying size. This can be achieved by providing additional pairs of corresponding mount bracket and mount boss.

The use of only two different mount brackets makes the system simpler and conventional panel mounting systems having a wide range of mount brackets each of differing size and/or geometry.

The shape of the locating tongue is designed to be stiff along its length to minimise bending and the rounded sides remove the possibility of sharp edges causing damage to the mount brackets when loaded on one side.

The locating tongue can be stamped or laser cut out of sheet metal and the forming process requires one operation only. This makes the part very light and low cost.

Optionally, the sliding mount bracket comprises a recess adapted to accommodate a second end of the locating tongue of the sliding mount boss.

The recess provides for the locating tongue to be secured from movement out of the plane of the panel and/or casing while allowing relative in-plane movement therebetween.

Optionally, the sliding mount bracket is formed with a top hat cross sectional profile with the recess being located within the top hat profile.

Each of the mount brackets is formed from sheet metal making the panel attachment system simple and cheap to manufacture.

Forming the mount bracket from sheet metal provides the bracket with a high relative stiffness which in turn makes the system of the invention more weight efficient.

The use of sheet metal for the mount brackets results in minimal disruption to airflow which passes between the panel and the casing. This minimises the losses associated with the mount brackets and so makes the mounting system more efficient.

The use of a threaded fastener to attach the locating tongue to the second fixed mount boss makes the assembly of the sliding mount boss simpler and easier for a user.

Optionally, the locating tongue comprises an anti-rotation tab at the first end thereof, the anti-rotation tab being engaged with the second fixed mount boss to thereby prevent relative rotation between the locating tongue and the second fixed mount boss.

The anti-rotation tab ensures correct alignment of the tongue and allows for a single bolt to be used to secure the part in place.

Optionally, the locating tongue is formed as a planar surface with a flange formed along each side edge extending from the first end to the second end, each flange being upturned from the planar surface in a direction distal to the casing.

The presence of flanged portions along the side edges of the locating tongue provides increased bending stiffness along the length of the locating tongue. This enables the locating tongue to be made lighter whilst maintaining a certain stiffness level, which in turn makes the system of the invention more weight-efficient and hence more useful for a user.

Optionally, the fixed mount bracket comprises a sliding mount bracket having an aperture in a center portion of the top hat cross sectional profile.

This makes the invention simpler and cheaper to manufacture and so more convenient for a user.

Optionally, the first fixed mount boss is connected to the fixed mount bracket by a threaded fastener.

According to a second aspect of the present invention there is provided a method of attaching a panel to a casing, the panel comprising a fixed mount bracket and a sliding mount bracket, and the casing comprising a first fixed mount boss and a sliding mount boss, the sliding mount boss comprising a second fixed mount boss, and a locating tongue comprising a first end and a second end, the first end being connected to the second fixed mount boss by a threaded fastener, and the second end extending substantially parallel to the casing, the method comprising the steps of:
 a. positioning the panel relative to the casing such that the sliding mount bracket is aligned with the sliding mount boss;
 b. slidingly engaging the second end of the locating tongue with the sliding mount bracket until the fixed mount bracket is in alignment with the first fixed mount boss;
 c. securing the fixed mount bracket to the first fixed mount boss.

The method of the present invention is simple in that the panel can be attached to the casing by aligning and engaging the or each sliding mount bracket/boss pair and then securing the corresponding the or each fixed mount bracket/boss pair. This is simpler and more straightforward than conventional arrangements in which a plurality of bracket boss pairs must each be aligned, engaged and fastened together with separate fasteners. In this way, the method of the present invention is simpler and easier to use than conventional alternative methods, making the method of the present invention more convenient and efficient for a user.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
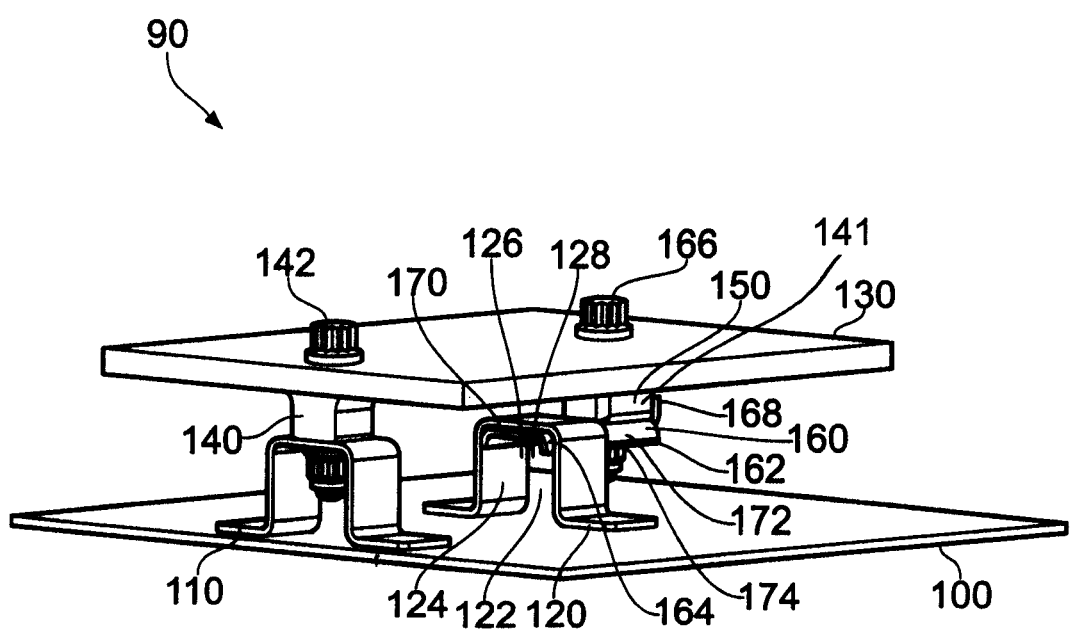
FIG. 1 shows a perspective view of a panel attachment system according to a first embodiment of the invention.
Figure 2:
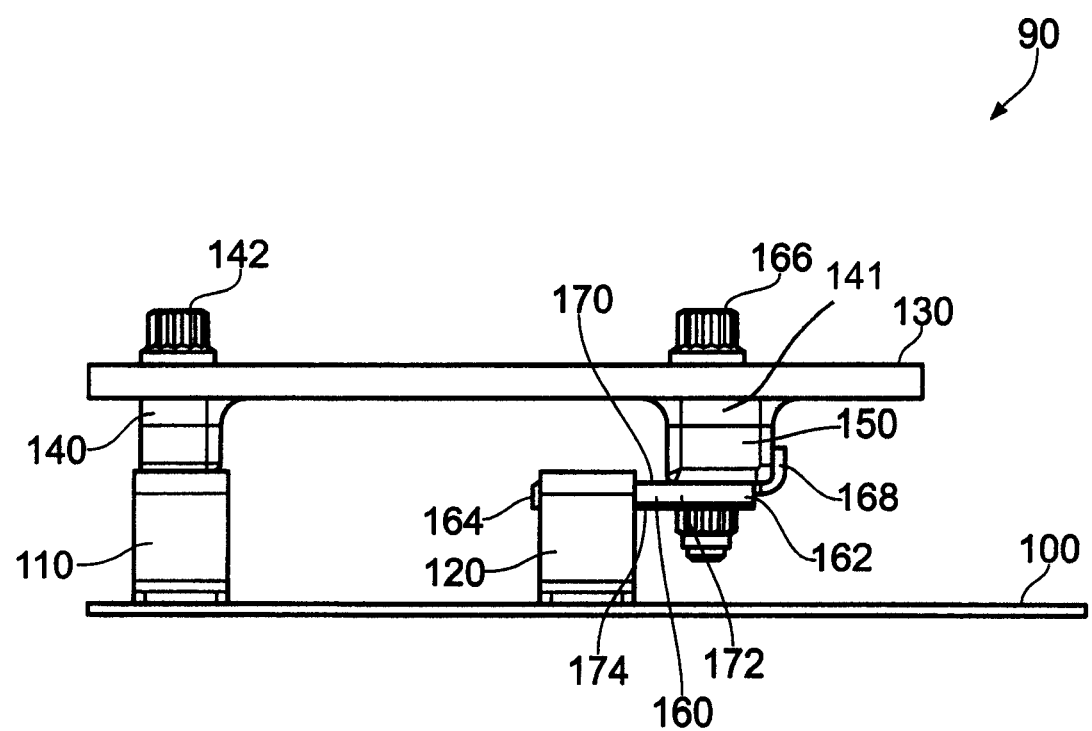
FIG. 2 shows an elevational view of the panel attachment system of FIG. 1.
Figure 3:
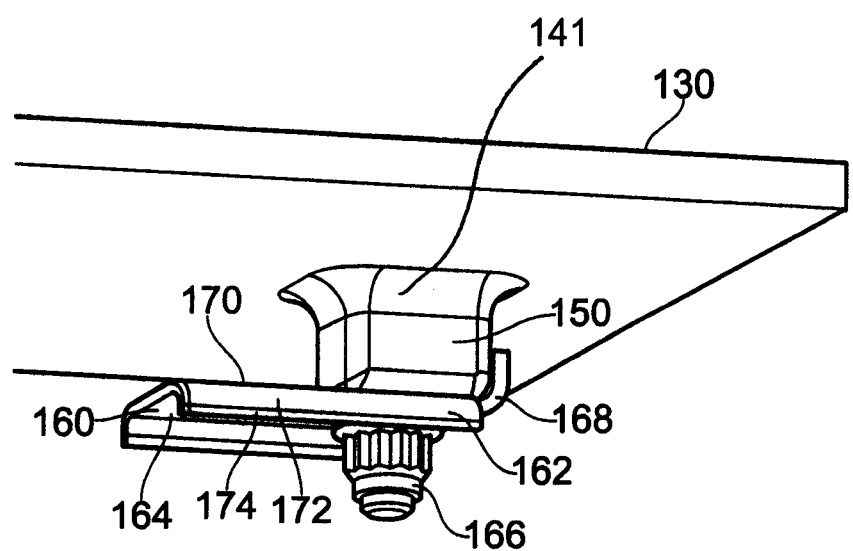
FIG. 3 shows a perspective view of the casing and sliding mount boss of the panel attachment system of FIG. 1.
Figure 4:
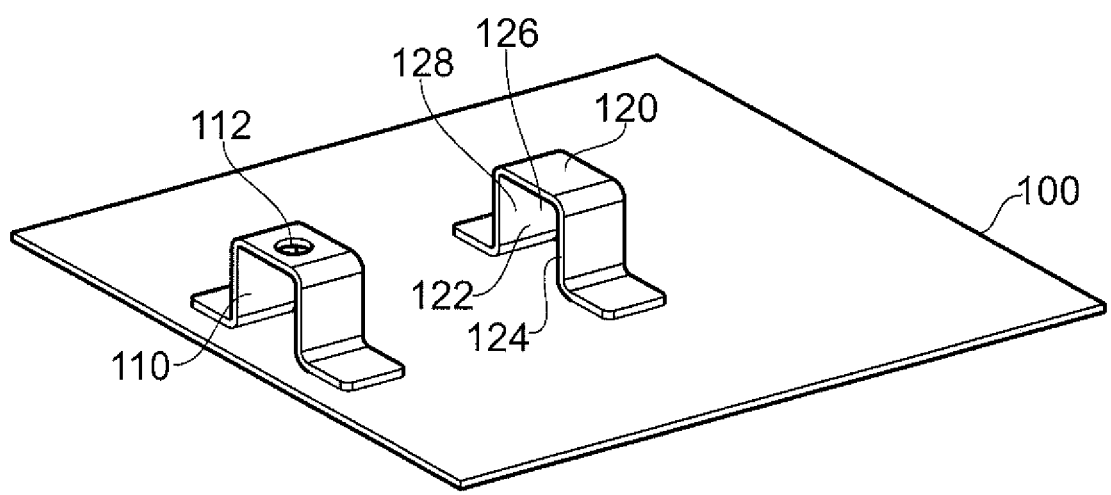
FIG. 4 shows a perspective view of the panel and mount brackets of the panel attachment system of FIG. 1.

Referring to FIGS. 1 to 4, a panel attachment system according to an embodiment of the invention is designated generally by the reference numeral 90.

The panel attachment system 90 comprises a panel 100 and a casing 130. In the present embodiment, the casing 130 is a casing of a gas turbine engine exhaust assembly (not shown) while the panel 100 is an exhaust liner panel positioned on an internal face of the gas turbine engine exhaust casing.

In the embodiment shown in FIGS. 1 to 4, the panel 100 and the casing 130 are formed from a titanium alloy sheet. However in other arrangements, the panel 100 and casing 130 may be formed from other materials such as other metal or metal alloy sheet materials, or fibre reinforced composite sheet.

The panel 100 comprises a fixed mount bracket 110 and a sliding mount bracket 120. In the present embodiment, each of the fixed mount bracket 110 and sliding mount bracket 120 is formed from titanium alloy sheet and is welded to an inner surface of the panel 100.

Each of the fixed mount bracket 110 and sliding mount bracket 120 is formed with a top hat cross sectional profile 124. This results in there being a recess 122 within the top hat profile 124. In the present embodiment, each of the fixed mount bracket 110 and sliding mount bracket 120 has the same cross-sectional profile.

Indeed, in the present embodiment the fixed mount bracket 110 comprises a sliding mount bracket 120 to which has been added an aperture 128 in the center portion 126 of the top hat cross sectional profile 124.

Similarly, the casing 130 comprises a first fixed mount boss 140 and a sliding mount boss 150. The first fixed mount boss 140 is formed from a titanium alloy billet and in this embodiment takes the form of a rectilinear block. The sliding mount boss 150 comprises a second fixed mount boss 141, in the form of a titanium alloy block, and a sheet metal locating tongue 160 that is bolted thereto.

The locating tongue 160 is formed as a rectangular sheet metal tab having a first end 162 and an opposite second end 163 with a planar surface 170 extending therebetween. Along each axial side edge 172 of the planar surface 170 is formed a flange 174. Each flange 174 is directed away from the casing 130.

The locating tongue 160 is fastened to the rectilinear block with a threaded fastener 166 to thereby form the sliding mount boss 150.

The first end 162 of the locating tongue 160 is provided with an anti-rotation tab 168. The anti-rotation tab 168 is formed as an upturned projection which locates against a side face of the rectilinear block of the sliding mount boss 150. The anti-rotation tab 168 prevents the locating tongue 160 from turning relative to the rectilinear block during assembly of the panel 100 to the casing 130.

The locating tongue 160 can be optimised in shape for the level of load it is required to take by, for example, moving the position of the threaded fastener 166 which will allow more supporting material acting as a counter lever. Another easily adaptable feature is the depth of the flange 174, which will define the stiffness and weight of the locating tongue 160.

In use, the panel 100 is positioned against the casing 130 such that the fixed mount bracket 110 and the sliding mount bracket 120 are respectively aligned with, and offset relative to, the first fixed mount boss 140 and the sliding mount boss 150. The locating tongue 160 is correspondingly oriented relative to the sliding mount bracket 120 such that the second end 164 is aligned with the recess 122.

The panel 100 is moved relative to the casing 130 thereby engaging the locating tongue 160 within the recess 122 defined by the sliding mount bracket 120. When the locating tongue 160 is fully engaged within the recess 122 the rectilinear block abuts against the sliding mount bracket 120, and the first fixed mount boss 140 is aligned with the fixed mount bracket 110 such that the threaded fastener 142 can be passed through the aperture 112 to secure the panel 100 to the casing 130.

The panel attachment system 90 shown in the figures provides a low level of airflow blockage between the casing 130 and liner 100 whilst utilising standardised low cost sheet metal parts. By adjusting the height of the first fixed mount boss 140 and the sliding mount boss 150 it is possible to use the same locating tongue 160 and bracket components in all sliding mount positions. The heights of the first fixed mount boss 140 and the sliding mount boss 150 then become the feature which controls the panel 100 position relative to the casing 130, making it possible to use the same hanger components at any boss location. The number of first fixed and sliding mount bosses 140,150, locating tongues 160 and mount brackets 110,120 is dictated by the length of the panel 100 and level of support required but the arrangement can simply be repeated in a row down the casing 130/panel 100.

Friction forces between the locating tongue 160 and mount brackets 110,120 should be managed through careful selection of materials and by maintaining bracket stability on the panel 100. As the bracket height increases, so should its width in order for the push/pull forces to be reacted correctly. This may necessitate increasing the number of 'feet' on the bracket, making it more stable but keeping weight as low as possible (see other embodiments). Having a stable bracket causes the friction force to be broken rather than the bracket being twisted and rocked on the liner that would eventually lead to part failure.

With only one type of locating tongue 160 and two types of bracket 110,120, the assembly of the system is simple, reducing the likelihood of mounts being incorrectly positioned. Usually two columns of hangers will be used per panel; with two fixed mount brackets at one end and several rows of locating tongues 160 and brackets along the length of the panel.

The foregoing description of various aspects of the invention has been presented for purposes of illustration and description. It is not intended to be exhaustive or to limit the invention to the precise form disclosed, and obviously, many modifications and variations are possible.

What is claimed is:

1. A panel attachment system comprising:
   a panel comprising:
      a fixed mount bracket; and
      a sliding mount bracket; and
   a casing comprising:
      a first fixed mount boss; and
      a sliding mount boss;
         the sliding mount boss comprising:
            a second fixed mount boss; and
            a locating tongue comprising a first end and a second end, the second end extending substantially parallel to the casing,
   wherein, in use, the fixed mount bracket is fixedly secured to the first fixed mount boss, and the first end of the locating tongue is connected to the second fixed mount boss by a threaded fastener, and the second end of the locating tongue is slidingly engaged with the sliding mount bracket, to thereby detachably connect the panel to the casing, such that any relative in-plane thermal expansion between the panel and the casing is accommodated by corresponding relative movement between the sliding mount bracket and the sliding mount boss.

2. The panel attachment system as claimed in claim 1, wherein the sliding mount bracket comprises a recess adapted to accommodate a second end of the locating tongue of the sliding mount boss.

3. The panel attachment system as claimed in claim 2, wherein the sliding mount bracket is formed with a top hat cross sectional profile with the recess being located within the top hat profile.

4. The panel attachment system as claimed in claim 3, wherein the fixed mount bracket comprises a sliding mount bracket having an aperture in a center portion of the top hat cross sectional profile.

5. The panel attachment system as claimed in claim 1, wherein the locating tongue comprises an anti-rotation tab at the first end thereof, the anti-rotation tab being engaged with the second fixed mount boss to thereby prevent relative rotation between the locating tongue and the second fixed mount boss.

6. The panel attachment system as claimed in claim 1, wherein the locating tongue is formed as a planar surface with a flange formed along each side edge extending from the first end to the second end, each flange being upturned from the planar surface in a direction distal to the casing.

7. The panel attachment system as claimed in claim 1, wherein the first fixed mount boss is connected to the fixed mount bracket by a threaded fastener.

8. A method of attaching a panel to a casing, the panel comprising a fixed mount bracket and a sliding mount bracket, and the casing comprising a first fixed mount boss and a sliding mount boss, the sliding mount boss comprising a second fixed mount boss, and a locating tongue comprising a first end and a second end, the first end being connected to the second fixed mount boss by a threaded fastener, and the second end extending substantially parallel to the casing, the method comprising the steps of:
   a. positioning the panel relative to the casing such that the a sliding mount bracket is aligned with the sliding mount boss;
   b. slidingly engaging the second end of the locating tongue with the sliding mount bracket until the fixed mount bracket is in alignment with the first fixed mount boss;
   c. securing the fixed mount bracket to the first fixed mount boss.

* * * * *